US011295590B2

(12) United States Patent
Trivelpiece et al.

(10) Patent No.: US 11,295,590 B2
(45) Date of Patent: Apr. 5, 2022

(54) UNIFIED SECURITY DEVICE

(71) Applicants: Steve E. Trivelpiece, Rancho Santa Margarita, CA (US); Craig E. Trivelpiece, Lake Forest, CA (US); David Torrecilla, Madrid (ES); Adam S. Bergman, Boca Raton, FL (US)

(72) Inventors: Steve E. Trivelpiece, Rancho Santa Margarita, CA (US); Craig E. Trivelpiece, Lake Forest, CA (US); David Torrecilla, Madrid (ES); Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 62 days.

(21) Appl. No.: 16/662,758

(22) Filed: Oct. 24, 2019

(65) Prior Publication Data
US 2020/0134998 A1 Apr. 30, 2020

Related U.S. Application Data

(60) Provisional application No. 62/750,618, filed on Oct. 25, 2018.

(51) Int. Cl.
*H04W 4/80* (2018.01)
*G08C 19/14* (2006.01)
*G08B 13/24* (2006.01)

(52) U.S. Cl.
CPC ..... *G08B 13/2417* (2013.01); *G08B 13/2468* (2013.01); *H04W 4/80* (2018.02)

(58) Field of Classification Search
CPC .................................................. G08B 13/2417
See application file for complete search history.

(56) References Cited

U.S. PATENT DOCUMENTS

| | | | |
|---|---|---|---|
| 2006/0273902 A1 | 12/2006 | Shafer | |
| 2009/0140860 A1* | 6/2009 | Forster | G08B 13/2431 340/572.1 |
| 2010/0007499 A1 | 1/2010 | Arguin | |
| 2014/0085089 A1* | 3/2014 | Rasband | G08B 13/246 340/572.1 |

(Continued)

FOREIGN PATENT DOCUMENTS

WO 2013192033 A1 12/2013

OTHER PUBLICATIONS

International Search Report and Written Opinion for PCT/US2019/057865 dated Mar. 6, 2020.

(Continued)

*Primary Examiner* — Joseph H Feild
*Assistant Examiner* — Pameshanand Mahase
(74) *Attorney, Agent, or Firm* — Arent Fox LLP

(57) ABSTRACT

Systems and methods for operating a Unified Security Device ("USD"). The methods comprise: receiving an Electronic Article Surveillance ("EAS") interrogation signal with an antenna of the USD; processing the EAS interrogation signal using a processor unit of the USD; using the processor unit to generate an EAS response signal that emulates a response signal produced by an Acousto-Magnetic (AM) type of EAS security tag, in response to the EAS interrogation signal; and communicating the EAS response signal from the USD.

28 Claims, 7 Drawing Sheets

(56) References Cited

U.S. PATENT DOCUMENTS

2016/0364968 A1* 12/2016 Sharpy ................ G08B 13/242
2020/0226333 A1* 7/2020 Riggert ............. G06K 7/10425
2021/0158123 A1* 5/2021 Forster ............... G06K 19/0726

OTHER PUBLICATIONS

Invitation to Pay Additional Fees and Partial International Search Report issued for PCT/US2019/057865; dated Jan. 9, 2020.

* cited by examiner

UNIFIED SECURITY DEVICE

CROSS-REFERENCE TO RELATED APPLICATIONS

The present application claims priority to U.S. Patent Ser. No. 62/750,618 which was filed on Oct. 25, 2018. The contents of this patent application are incorporated herein in their entirety.

BACKGROUND

Statement of the Technical Field

The technical field of this disclosure concerns security devices. More particularly, the present disclosure concerns implementing systems and methods to provide a Unified Security Device ("USD") with multiple communication technologies integrated therein.

DESCRIPTION OF THE RELATED ART

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an Acousto-Magnetic ("AM") element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be deactivated or detached from the article upon purchase thereof in order to prevent the visual or audible alarm from being generated.

Radio Frequency Identification ("RFID") systems use wireless technology to automatically extract identification information from tags that are typically attached to objects or people. The information is electronically stored in the tag and is usually transmitted by the tag in response to an external electromagnetic stimulus. The tags are available in a variety of formats but are most commonly powered using electromagnetic induction methods. In such systems, the energy for powering the tag and for wirelessly transmitting the stored information is derived from an external applied Electro-Magnetic ("EM") field which is produced by a reader antenna (i.e., an antenna which is connected to an RFID reader system). Accordingly, each RFID tag will include an antenna to harvest energy from the externally applied EM field and to broadcast the information stored on the tag.

Near Field Communication ("NFC") refers to a defined type of short-range wireless communication where the separation between devices is on the order of about 10 cm or less. The system is configured to operate at a defined frequency of 13.56 MHz, and in accordance with a defined air interface standard (ISO/IEC 18000-3). In an NFC communications scenario, an initiator device generates an RF field that can power a passive target (e.g., a tag, a key fob, or an access control card).

SUMMARY

The present disclosure generally concerns implementing systems and methods for operating a USD. The method comprises: receiving an EAS interrogation signal with an antenna of the USD; processing the EAS interrogation signal using a processor unit of the USD; using the processor unit to generate an EAS response signal that emulates a response signal produced by an AM type of EAS security tag, in response to the EAS interrogation signal; and communicating the EAS response signal from the USD.

In some scenarios, the methods also comprise: using the processor unit to facilitate at least one of RFID communication operations and NFC communication operations; receiving, by the USD, a first command signal via an RFID communication or an NFC communication; and/or performing operations by the USD to disable at least one of an EAS communication function and an RFID communication function, in response to the first command signal. A digital processing unit control of the USD is used to disable the at least one of an EAS communication function and an RFID communication function, in response to the first command signal. The first command signal may be received from a Point-Of-Sale ("POS") device or a personal electronic device. The methods may further comprise: receiving, by the USD, a second command signal via an RFID communication or an NFC communication; and performing operations by the USD to re-enable at least the EAS communication function, in response to the second command signal.

In those or other scenarios, the methods also comprise: performing operations by the USD to harvest energy from EAS signals; and using the harvested energy to cause the USD to selectively transition operational modes from a passive mode to a Battery Assisted Passive ("BAP") mode for RFID communications.

In those or other scenarios, the USD comprises a thread incorporated into an item or is coupled to a swing ticket attached to the item. Additionally or alternatively, the USD comprises a single Integrated Circuit ("IC") chip that performs EAS communication operations, RFID communication operations, and NFC operations. The USD may comprise a Software Defined Radio ("SDR"). The EAS communication operations are used for theft prevention, the RFID communication operations are used for inventorying purposes, and the NFC communication operations are used for purchase transaction purposes.

In those or other scenarios, the methods also comprise: performing operations by the USD to obtain a measurement value for a strength of or a change in magnetic flux of a magnetic field being generated by an external device; using the measurement value to determine whether the USD is in proximity to a tag detacher; and/or performing operations by the USD to deactivate at least one of an EAS communication function and an RFID function, when a determination is made that the USD is in proximity to the tag detacher.

The present disclosure also concerns a USD. The USD comprising: at least one antenna; a Radio Frequency ("RF") circuit including at least one RF detector configured to receive an RF signal from the at least one antenna; and a processor unit. The processor unit is configured to: receive the RF signal from the at least one antenna; process the RF signal; generate a responsive RF signal in accordance with any one of a plurality of different predetermined communication protocols; and couple the responsive signal to the at least one antenna. The plurality of different predetermined communication protocols are selected from the group consisting of an RFID communication protocol, an NFC protocol, and an EAS communication protocol. The antenna, the RF circuit and/or the processor unit may be disposed on a single IC die. The RF circuit may be coupled to at least one antenna which is not disposed on the single integrated circuit die.

In some scenarios, the USD further comprises at least one energy harvesting circuit coupled to receive electromagnetic energy from an external source and use the electromagnetic energy to provide primary power to at least the processor unit.

Additionally or alternatively, the processor unit: is responsive to at least one control signal communicated to the processor in accordance with at least one of the NFC protocol and the RFID communication protocols; is responsive to the at least one control signal to selectively disable the USD from communicating in accordance with at least one of the EAS communication protocol and the RFID communication protocol; is responsive to an NFC communication session to communicate RFID tag data using the NFC communication protocol; and/or is configured to communicate with an external device in an NFC or RFID communication session using an encrypted data mode.

BRIEF DESCRIPTION OF THE DRAWINGS

This disclosure is facilitated by reference to the following drawing figures, in which like numerals represent like items throughout the figures.

DETAILED DESCRIPTION

Figure 1:
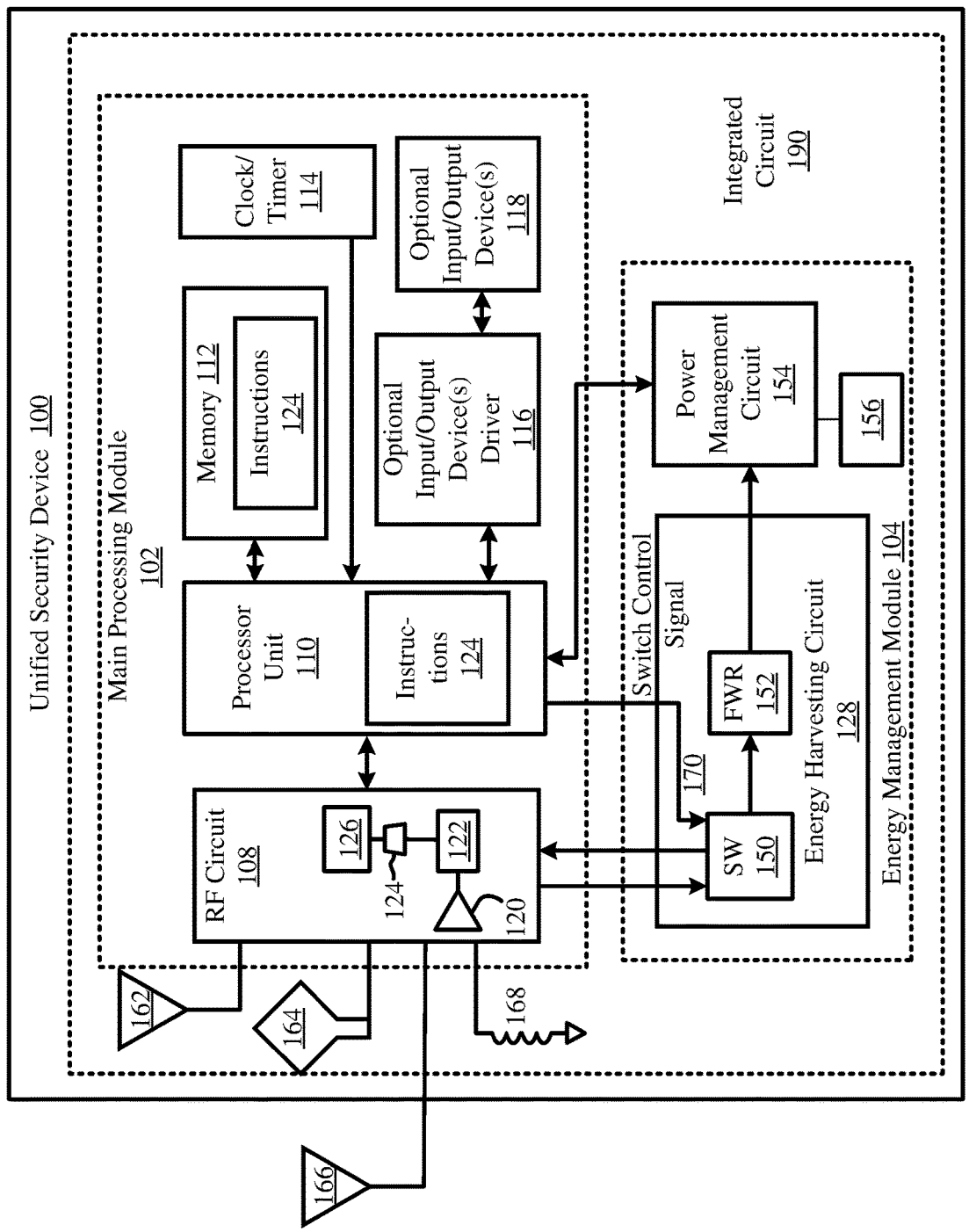
FIG. 1 is a block diagram of an illustrative USD.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "memory," "memory device," "data store," "data storage facility" and the like each refer to a non-transitory device on which computer-readable data, programming instructions (e.g., instructions 124 of FIG. 1) or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

Conventional EAS tags and RFID tags are commonly used in a retail store context to prevent theft. More recently, dual-technology tags have been proposed in which conventional EAS and RFID implementations have been combined in one package. But by combining these units externally results in relatively high costs and this hardware cannot be built into a thread form factor or an inexpensive swing ticket. The solution is a single Integrated Circuit ("IC") semiconductor chip referred to herein as a USD that will perform all of the functions of an EAS tag and an RFID tag, as well as have additional functionality supported by NFC. An advantage of the USD described herein is that it is fully backward compatible with current EAS and RFID systems that are already installed at retail facilities. The USD will function in the same way, or more effectively, than conventional EAS tags, RFID tags and EAS/RFID tags.

In the USD, the integrated EAS functionality is used to prevent theft from retail facilities, while the RFID functionality is used for inventory management purposes. As such, the EAS functionality facilitates the detection of items leaving a defined security area (e.g., the retail store premises) by EAS systems, while the RFID functionality facilitates the identification of an item that has been stolen by an inventorying system since the item is no longer detected within the retail facility. However, the integrated NFC functionality of the USD can be used to facilitate self-checkout by customers, and to selectively deactivate the EAS and/or RFID functionality of the USD to prevent false alarms when leaving the premises of a retail facility along with successfully purchased items. By combining these three functionalities into a single IC chip, the USD retains the benefits of EAS frequency reception (e.g., active EAS tags can be read easily at the exit gates by EAS systems and cause alarm issuances).

In addition, the EAS antenna associated with the USD could be used to harvest low frequency energy at the exit gate, whereby the RFID function can operate more effectively. For example, the energy harvested by the EAS component of the USD could be used to make the RFID component to the USD function in a Battery Assisted Passive ("BAP") mode instead of a default passive mode. In the passive mode, the RFID component of the USB requires an external source to provoke signal transmission. In the BAP mode, the RFID component of the USB also requires an external source to provoke signal transmission but has a significantly higher forward link capability that provides a greater read range. Accordingly, the BAP mode allows the USB to transmit an RFID signal a greater distance as compared to when operating in a passive mode. Such an arrangement can facilitate a theft detection system in which both an EAS alarm is issued by an EAS system and sufficient energy is provided for an RFID reader to read RFID data from the USD that is located a relatively far distance away. The read RFID data is used to verify whether or not the associated item was successfully purchased. If so, the EAS alarm issuance can be interrupted or otherwise discontinued so as to prevent a false alarm. If not, the EAS alarm issuance is allowed to continue.

In the described system, all three functions (i.e., NFC checkout functions, EAS detection function, and RFID inventory control functions) are performed by a single IC chip. In some scenarios, functionality associated with two or more of these functions can be carried out by a single processing element. For example, all three functions can be implemented using a single processing unit. In this regard, it may be noted that EAS functionality is achieved without the use of conventional magnetostrictive, ferromagnetic amorphous metal strips used in conventional AM type EAS systems. Instead, the conventional response normally facilitated by the metal strips in an AM type EAS system is emulated by the IC chip (e.g., by the same processor unit), which also performs the NFC functions and the RFID functions.

The USD described herein offers many benefits. The NFC functionality of the USD will allow a customer to purchase a product (i.e., self-checkout) by completing a purchase using a personal electronic device (e.g., a smart phone). As part of this self-checkout process, the NFC functionality also allows the customer to disable or inhibit the EAS response capability of the IC chip. In this regard, the user device can cause the USD to inhibit an EAS function and/or an RFID function. Once the EAS functionality of the USD is disabled, no EAS detection will occur at an exit portal of a retail facility. Notably, because an AM type EAS tag's response function is emulated by the processing unit, the USD facilitates a simple and inexpensive way to disable the EAS ring down response with a digital processing unit control. This is much cheaper than adding hardware to disable the EAS response of a mechanical EAS label.

Further, as part of this self-checkout process, the NFC functionality can allow the personal electronic device (e.g., smart phone) to receive RFID tag information associated with the USD. The personal electronic device can then use WiFi or cellular communication data link to communicate with a remote inventory management server operated by the retail facility. Consequently, an RFID value associated with the USD could be marked as "sold" in a database of an inventory management system. Thereafter, if the RFID tag is detected (e.g., by an RFID detection system) leaving the retail store premises, the inventory management system will not mark the item as an unauthorized occurrence. Encrypted communications between the personal electronic device and the USD, and then between the personal electronic device and the inventory management server, can ensure that potential thieves cannot illicitly mark an item as being sold.

A further benefit of the USD is that it can be integrated into an item of merchandise (e.g., can be put into a thread form factor that can be installed into the fabric). In some scenarios, the relatively low cost of the USD can facilitate using it in a simple swing ticket not requiring a hard tag form factor.

In some scenarios, the EAS, RFID and NFC communications performed by the single IC comprising the USD can be facilitated by multiple antennas which are connected to the semiconductor chip. However, the solution is not limited in this respect and in other scenarios two or more of these services can potentially use a common antenna. In some scenarios, at least one antennas (e.g., an EAS antenna) can be disposed off-chip on a suitable substrate to which the USD is attached. Also, smaller EAS antennas are facilitated with the solution disclosed herein because the processing unit that is used to emulate an EAS function can be more sensitive than conventional EAS hardware. Further, the energy harvesting carried out by the USD can allow for a less sensitive RFID antenna in a scenario where sufficient energy is harvested to support to BAP type RFID mode.

A further advanced feature that is supported by the solution disclosed herein is automatic disabling of an EAS response when the USD is placed near a conventional magnetic tag detacher as is commonly used in a retail environment to remove an EAS tag. The disabling of the EAS response can be performed based on a measurement of the change in flux of a magnetic field using another coil or the current coils of the EAS tag. This could be used to determine that the EAS tag is near a 5 or 9 Kilo Gauss fixed magnetic field. This will allow the USD to determine that the EAS tag is being placed near a magnetic detacher. This information is used to cause the processing unit to set a bit that will disable the EAS alarming at the door.

Conventional RFID and EAS operations in a retail environment are well-known and therefore will not be described here. Likewise, conventional NFC communication protocols and methods are well-known in the art. However, in the solution presented herein, the functions and features of RFID, EAS and NFC are combined in a single IC chip to obtain surprisingly advantageous results.

USD Architecture

Referring now to FIG. 1, there is shown a hardware block diagram of an illustrative USD 100 which is configured to perform RFID, NFC and EAS functions. The USD 100 is advantageously implemented as a single IC 190 such that it can be economically manufactured and easily incorporated into or coupled to an item of merchandise or a tag (e.g., a swing tag) which is attached to such merchandise. The incorporation/coupling can be achieved via an adhesive, a clamp, a stitching, a weld, or other coupling means. The IC 190 can be formed using conventional methods, and using conventional semiconductor materials (e.g., silicon (Si) or gallium arsenide (GaAs)).

Figure 6:
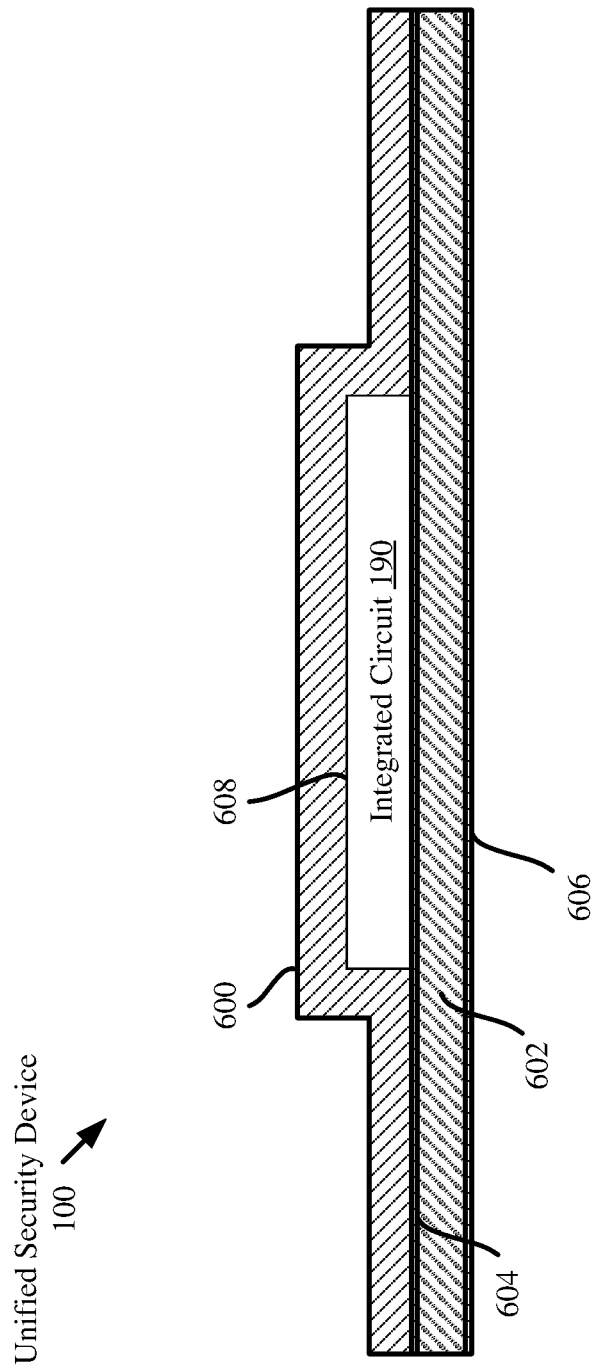
FIGS. 6-7 each provide an illustration that is useful for understanding an illustrative architecture of a USD.
Figure 7:
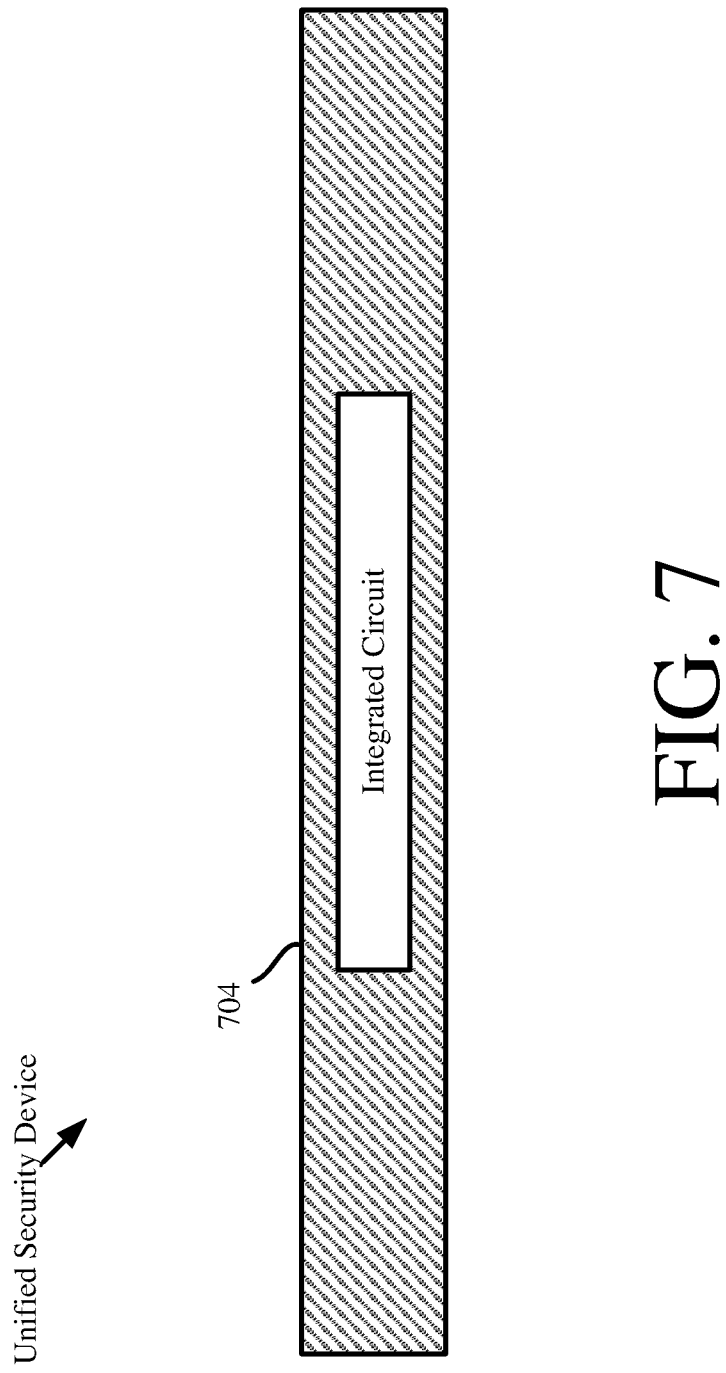

In some scenarios, the IC 190 may be disposed between two cover layers. For example, as shown in FIG. 6, the IC 190 is enclosed within a cavity 608 formed between a top cove layer 600 and a bottom cover layer 602. The cover layers are formed of a rigid, semi-rigid, or flexible material. Such material can include, but is not limited to, paper and/or plastic. The two covers 600, 602 are coupled to each other via an adhesive or weld 604. An adhesive 606 may be provided on the bottom exposed surface of cover 602. This adhesive 606 facilitates the coupling of the USD 100 to an item of merchandise or a tag (e.g., a swing tag or other tag) of the item of merchandise. The present solution is not limited in to the particulars of this example. As noted above, the IC can alternatively be in a thread form and incorporated into the fabric or stitching of the item. For example, as shown in FIG. 7, the IC is incorporated into a strand of material 700 (e.g., cotton, nylon and/or other fibers).

Notably, conventional EAS tags comprise hard tag bodies and pins/tacks which are passed through items of merchandise (e.g., clothing) and secured by a securement mechanism in the hard tag bodies. This pin/tack solution may result in damage to the item of merchandise. The present USD solution eliminates the need for a pin/tack in an EAS tag, and therefore provides an improved solution as compared to conventional EAS tags (especially when implemented with a thread form factor).

The USD 100 may include more or less components than those shown in FIG. 1. However, the components shown are sufficient to disclose an illustrative embodiment implementing the present solution. More particularly, the hardware architecture of FIG. 1 represents one embodiment of a representative computing device configured to facilitate RFID, NFC and EAS functions on an single IC 190. As such, the USD 100 of FIG. 1 is capable of implementing at least a portion of a method for implementing a unified security tag solution described herein.

Some or all the components of the USD 100 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The USD 100 shown in FIG. 1 includes a Primary Processing Module ("PPM") 102 and an Energy Management Module ("EMM") 104. The PPM 102 is comprised of an RF circuit 108, a processor unit 110, a memory 112, a clock/timer 114, optional input/output device(s) driver(s) 116, and optional input/output devices 118. The processor unit 110 can comprise one or more components such as a Central Processing Unit ("CPU"), an application specific circuit, a programmable logic array, a Digital Signal Processor ("DSP"), and/or other circuit programmed to perform the functions described herein. Memory 112 can comprise a volatile memory and/or a non-volatile memory. For example, the memory 112 includes, but is not limited to, Random Access Memory ("RAM"), Dynamic RAM ("DRAM"), Static RAM ("SRAM"), Read Only Memory ("ROM") and flash memory. The memory 112 may also comprise unsecure memory and/or secure memory.

The processor unit 110 can perform actions involving access to and use of memory 112 on which is stored one or more sets of instructions 124 (e.g., software code) configured to implement one or more of the methodologies, procedures, or functions described herein. The instructions 124 can also reside, completely or at least partially, within the processing unit 110 during execution thereof by the processing unit. As such, the memory 112 and the processing unit 110 can comprise machine-readable media. The term "machine-readable media", as used here, refers to a single medium or multiple media that store the one or more sets of instructions 124. The term "machine-readable media", as used here, also refers to any medium that is capable of storing, encoding or carrying a set of instructions 124 for execution by the processor unit 110 that cause such device to perform any one or more of the methodologies of the present disclosure.

The RF circuit 108 can be configured to implement one or more radio frequency transceivers which facilitate any of one or more communication protocols (e.g., EAS, NFC and/or RFID). The exact configuration of the RF circuit will depend in part upon the extent of signal processing that is to be performed by the processor unit 110. In a scenario in which the radio transceiver operations are primarily implemented in hardware, the RF circuit 108 can comprise one or more of a diplexer, a Low Noise Amplifier ("LNA") 120, an RF filter 122, an oscillator, a mixing circuit, an IF gain stage, IF filtering circuits, a detector circuit 124 and at least one Analog-to-Digital Converter ("ADC") 126.

Additionally or alternatively, the signal processing is handled by the processor unit 110 in the digital domain. In such a scenario, the RF circuit 108 may comprise fewer components. For example, the RF circuit 108 in such a scenario could comprise the RF filter 122, LNA 120, detector circuit 124 and ADC 126 for analog-to-digital conversion. The processing and extraction of signals associated with the EAS, RFID and NFC services can be performed primarily in the digital domain.

In scenarios where the RF signal processing is primarily performed in the processor unit 110, the processor unit can operate cooperatively with the RF circuit 108 to implement a Software Defined Radio ("SDR"). SDRs are well known in the art, and therefore will not be described in detail herein. However, it should be noted that the SDR can be programmatically assigned to facilitate any of one or more communication protocols that is chosen by a user (e.g., NFC and/or RFID). In such a scenario, the communication protocols for each standard can be included as part of the processing unit firmware and may also reside in memory 112. Similarly, the processor unit 110 can implement a communication protocol associated with a well-known AM EAS tag detection method. In some scenarios, the SDR performs NFC, RFID and/or EAS communication operations concurrently or simultaneously. In other scenarios, the SDR selectively switches operations between the NFC operations, RFID communication operations, and the EAS communication operations. This selective switching can occur in response to a trigger event. The trigger events can include, but are not limited to, receipt of a given type of signal (e.g., an EAS interrogations signal, and RFID interrogation signal, or an NFC signal), a day, a time of day, and/or an expiration of a given amount of time.

The energy harvesting circuit 128 and power management circuit 130 are provided for ensuring continuous operation of the USD 100 without the need to change a battery. The energy harvesting circuit 128 may be configured to harvest energy from one or more sources (e.g., a magnetic field generated by an EAS system and/or RF energy from an RF source (e.g., an RFID interrogation signal)) and to generate a relatively low amount of output power from the harvested energy. By employing multiple sources for harvesting, the energy harvesting circuit 128 can continue to harvest energy in various scenarios where one type of energy is not available.

The exact configuration of the energy harvesting circuit 128 is not critical. However, in the block diagram shown in FIG. 1, the energy harvesting circuit 128 comprises a switch 150, a Full Wave Rectifier ("FWR") 152, a power management circuit 154 and an Energy Storage Device ("ESD") 156 (e.g., a super capacitor). The energy harvesting circuit 128 may also comprise matching circuits (not shown) to optimize a power transfer from an antenna and/or to impedance match the antenna to a transceiver associated with RF circuit 108. The switch 150 can include, but is not limited to, a Field Effect Transistor ("FET") switch. The FET switch may comprise a Heterostructure FET ("HFET") which without applied power directly couples one or more of the antennas 162, 164, 166 or coil 168 to the energy harvesting electronics. In some scenarios, a single antenna 162, 164, 166 or coil 168 can be used to receive and transmit both RFID signals and EAS signals.

During operation, RF energy is emitted within a surrounding environment from equipment disposed at an access point of a restricted area. Upon entering into the RF field which corresponds to the antenna operating frequency, the energy harvesting circuit 128 charges up the energy storage device 156 (e.g., a super capacitor) to a pre-determined voltage level. In this regard, it should be understood that the switch 250 is normally in a position which provides an electrical connection or closed circuit between the antenna and the FWR 152, as shown in FIG. 1. The voltage output is sufficient to turn on or enable the energy harvesting electronics such that RF energy can be captured thereby.

The captured RF energy is passed through the switch 150 by virtue of the switches characteristics described above. The power management circuit 154 converts the received RF energy into direct current for generating electric power. The electric power is supplied to the ESD 156 (e.g., a super capacitor) for charging the same to the pre-determined voltage level. When the ESD 156 is charged to the pre-determined voltage level, power is supplied from the ESD 156 to the processor unit 110 via the power management circuit 154. The processor unit 110 can generate and send a switch control signal 170 to the switch 150. The switch control signal 170 includes a command to cause the switch 150 to change positions. In effect, the switch 150 can be disconnected from the energy harvesting circuit 128, whereby an open circuit is formed between the antenna(s) and the FWR 152.

One or more antennas 162, 164 are disposed as part of the IC 190 comprising USD 100 so as to facilitate the RF and/or EAS communications operations described herein. In some scenarios, the physical dimensions of the IC 190 may not be sufficient to support the physical size of an antenna that is needed for certain types of communications protocols. In such scenarios, one or more antennas 166 can also be disposed at locations off the IC die and on a carrier material (e.g., a tag) comprised of a plastic or cardboard material.

The inductive coil 168 could optionally be provided (or one of the antennas 162, 164, 166 could be used for this purpose) to detect a change in flux of a magnetic field. The processor unit 110 can receive a signal produced by the inductive coil 168 and then measure the change in flux of a magnetic field. This could be used to determine that the tag is near a 5 or 9 Kilo Gauss fixed magnetic field. This allows a determination that the USD 100 is being placed near a magnetic tag detacher. This information can then be used to cause the processor unit 110 to set a bit that will disable the EAS alarming at the door.

The processor unit 110 is programmed so that when an EAS interrogation signal is detected, the processor unit will generate (when enabled to do so) a proper EAS response, which emulates the way a metal strip in an active EAS tag would respond to such EAS interrogation signal. This signal will be communicated to the RF circuit 108 and is coupled to an antenna 162, 164 and/or 166.

USD Operations

The USD 100 as described can facilitate retail store operations. To appreciate the advantages of the USD 100, two use cases will now be described. In a first use case shown in FIG. 2, a customer 204 enters a retail store premises 200 where the USD 100 is attached to an item of merchandise 202. In this regard, the USD 100 may be directly coupled to the item (e.g., via an adhesive), coupled to a swing ticket (e.g., via an adhesive) that is attached to the item 202 (e.g., via a cord), or is integrated into a threaded part of the item.

When the consumer 204 wishes to purchase the item 202, (s)he may take it to a Point-Of-Sale ("POS") location 208 (e.g., a checkout counter). At the POS location 208, a clerk 206 can utilize a dedicated POS ("POS") device 210 to facilitate a purchase transaction. The POS device 210 can include, but is not limited to, an RFID capability and/or an NFC capability which is (are) configured to communicate with the USD 100 so as to extract information from the USD (e.g., identification data for the item 202 that is being purchased). The POS device 210 can also be configured to communicate with an inventory control/POS server 212.

The information retrieved by the POS device 210 from the USD 100 can be communicated to the inventory control/POS server 212. The inventory control/POS server 212 will then update an inventory database 214 in which the particular item of merchandise 202 is then marked as having been purchased. When the purchase is completed, the POS device 210 could send back a signal (e.g., using an NFC) to the USD 100 so as to cause the onboard processor unit 110 in the USD 100 to disable the EAS function. Thereafter, when the consumer 204 leaves the retail premises 200 through an exit portal 216, the USD 100 will be inhibited from triggering an EAS alarm. In other words, EAS controller 218 will not detect the presence of the EAS tag as it passes through EAS pedestals 220 because the USD 100 has disabled the EAS functionality. EAS pedestals are well known in the art, and therefore will not be described herein. Any known or to be known EAS pedestal can be used here. The USD 100 could in some scenarios be configured by the POS device 210 so that the RFID functionality of the USD is disabled.

In other scenarios, it can be advantageous to allow the USD 100 to respond to an RFID interrogation signal from an RFID system 222 so that a value associated with the USD 100 can be read as the USD leaves the retail premises 200. The RFID system 222 can be in communication with the inventory control/POS server 212 so that it is aware that the item 202 associated with the particular USD 100 has been purchased. Consequently, detection of the USD 202 by the RFID system 222 will not cause an alarm to sound because the USD value will have been marked as sold in an inventory control database 214. Consequently, the USD 100 can be fully backward compatible with currently installed systems.

In some scenarios, it can be advantageous to allow consumers to perform a self-checkout operation using an NFC or RFID enabled Personal Electronic Device ("PED") 224. The PED 224 is also referred to herein as a Mobile POS ("MPOS") device. The PED 224 can include, but is not limited to, a smart phone or a tablet computer. In such a scenario, the consumer 204 after shopping the store premises 200 would scan the product with the RFID and/or NFC enabled PED 224. The PED 224 could include an application software program which would facilitate such communications and in response thereto could display a price of the merchandise on a display associated with the PED. This process can be facilitated by a wireless communication between the PED 224 and the inventory control server 212 using a Local Area Network ("LAN") communication (e.g., a WiFi communication) or a cellular data network communication. At this point, the consumer 204 could continue shopping or decide to buy just this product. If the consumer 204 chooses to purchase the product, then such purchase can be completed by means of a further communication session with the inventory control/POS server 212 in which the consumer would follow a series of steps and prompts displayed on the PED 224. The purchase can be facilitated using payment software on the PED 224 (e.g., Apple Pay or any compatible method). The PED 224 would then use an encrypted data signal communicated to the USD 100 to cause the USD to disable the EAS and/or the RFID functions. The person could then leave the store immediately and the EAS controller 218 at the exit portal would not alarm.

Because the tag leaves the store and does not need to be removed, the tag can come back into the store later and will not alarm. This allows someone to return the product. When the item 202 is returned, the NFC communication mode could be used by the POS device 210 to read the tag data and determine what was sold, when the item was sold, and where the item was sold. This allows for easy returns. Since the EAS disable is a digital control, this allows the tag to be put back into inventory when a cryptographically secure command is used to re-enable the EAS and/or RFID functionality of the USD 100.

Methods For Operating A USD

Figure 2:
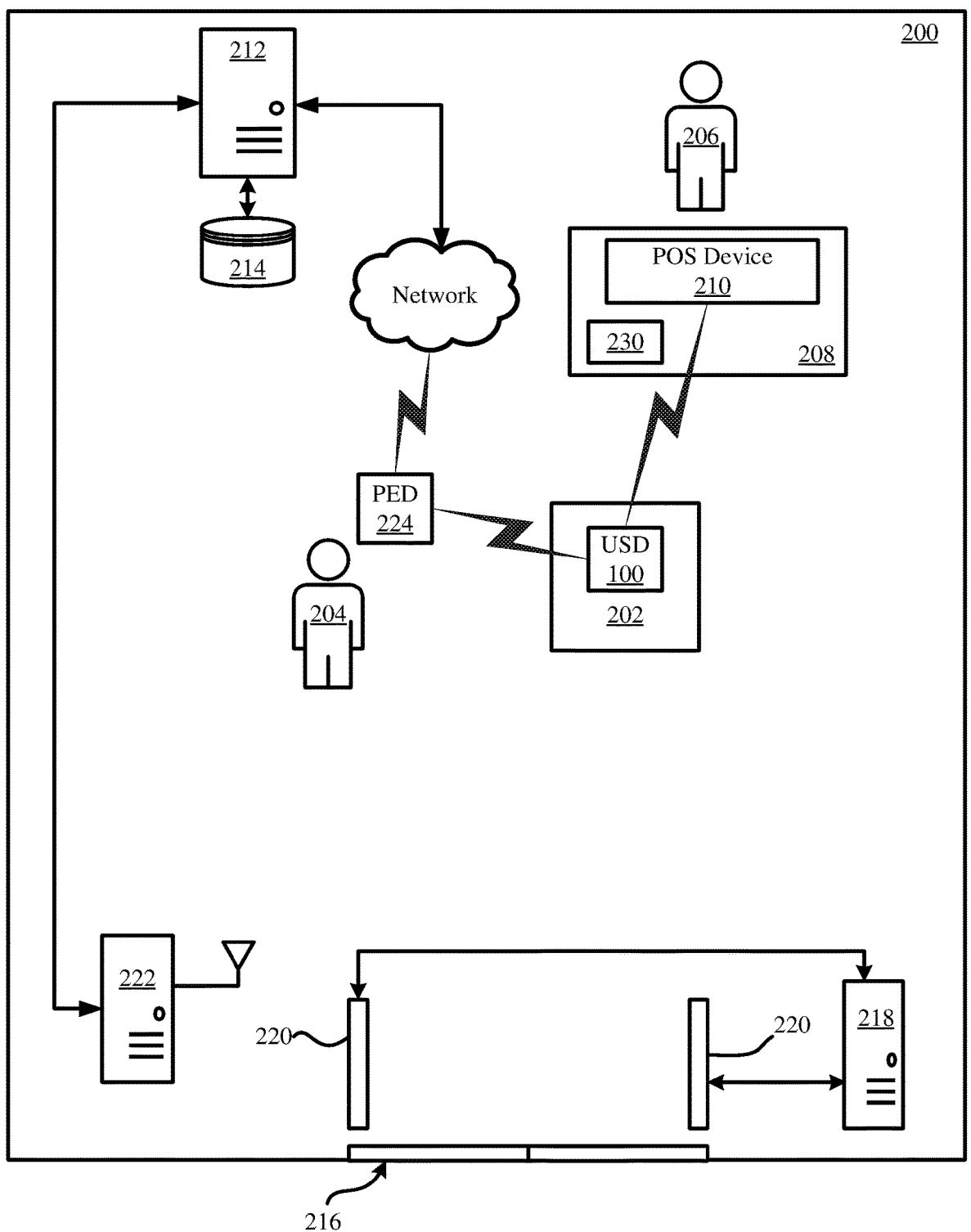
FIG. 2 is a diagram which is useful for understanding the operation of a USD in a retail store facility.
Figure 3:
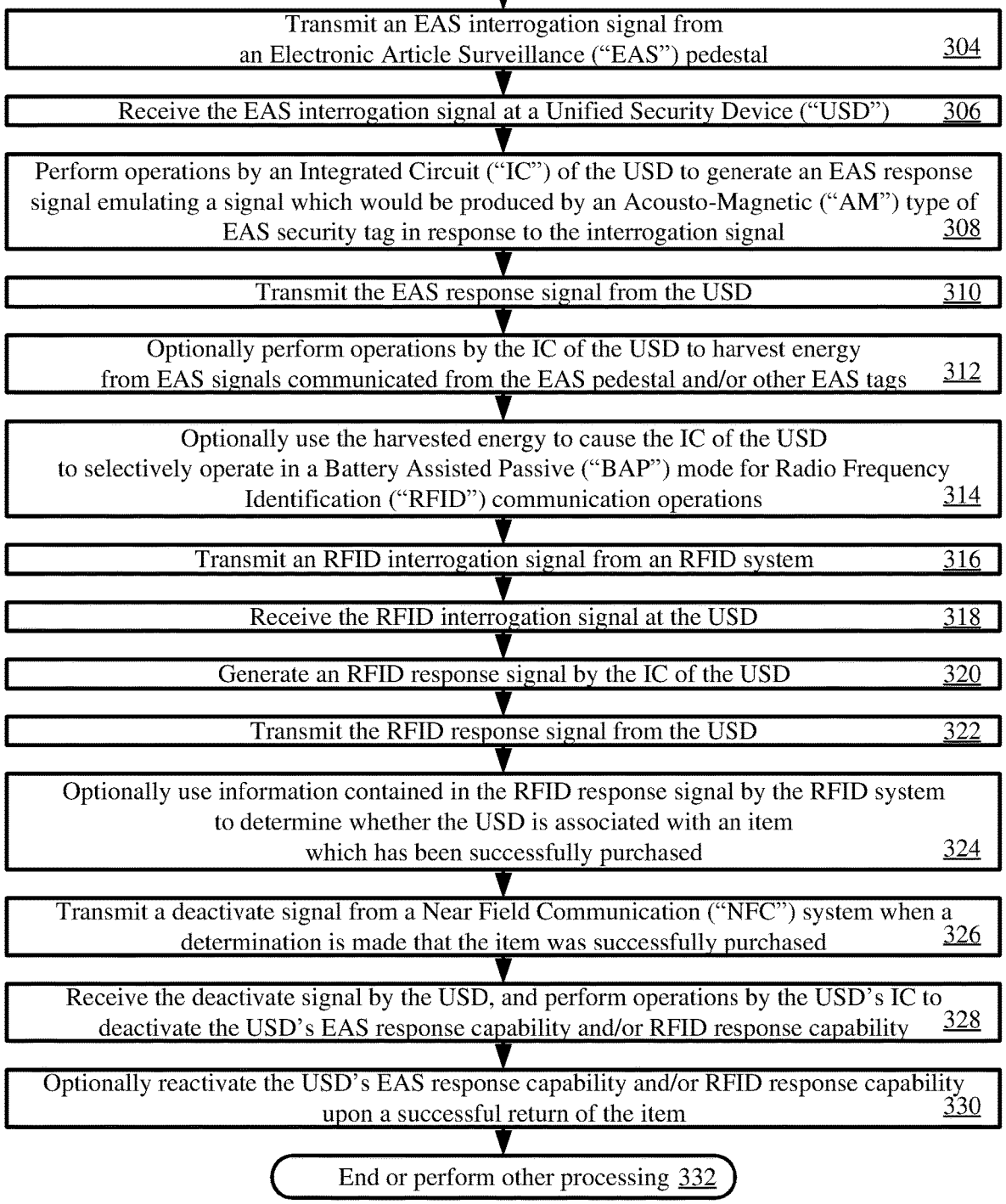
FIGS. 3-5 each provide a flow diagram of an illustrative method for operating a USD.

Referring now to FIG. 3, there is provided a flow diagram of an illustrative method 300 for operating a USD (e.g., USD 100 of FIGS. 1-2) in an anti-theft and/or inventorying scenario. Method 300 begins with 302 and continues with 304 where an EAS interrogation signal is transmitted from an EAS pedestal (e.g., EAS pedestal 220 of FIG. 2). EAS interrogation signals are well known in the art, and therefore will not be described herein.

The EAS interrogation signal is received at the USD in 306. At the USD, operations are performed in 308 to generate an EAS response signal. The EAS response signal emulates a signal which would be produced by an AM type of EAS security tag in response to the interrogation signal. Such signals produced by EAS security tags of the AM type are well known in the art, and therefore will not be described herein. The EAS response signal is then transmitted from the USD in 310.

In optional 312, an IC (e.g., IC 190 of FIG. 1) of the USD performs operations to harvest energy from EAS signals communicated from the EAS pedestal and/or other EAS tags. The harvested energy is optionally used in 314 to cause an IC of the USD to selectively operate in a BAP mode for RFID communication operations. In this regard, it should be understood that the RFID communication mode of the IC is transitioned from a passive mode to the BAP mode when the IC performs energy harvesting operations using the EAS antenna/coil (e.g., antenna 162, 164 or 166 of FIG. 1 and/or coil 168 of FIG. 1).

In 316, an RFID system (e.g., RFID system 222 of FIG. 2) transmits an RFID interrogation signal. RFID systems and RFID interrogation signals are well known in the art, and therefore will not be described here. The RFID interrogation signal is received at the USD in 318. In response to the RFID interrogation signal, the IC of the USD generates an RFID response signal. The RFID response signal can include, but is not limited to, an identifier of the USD and/or an identifier for the item (e.g., item 202 of FIG. 2) to which the USD coupled. The RFID response signal is transmitted from the USD in 322.

In optional 324, the RFID system uses the information contained in the RFID response signal to determine whether the USD is associated with an item which has been successfully purchased. This determination can be made by: communicating the information to an inventory control/POS server (e.g., inventory control/POS server 212 of FIG. 2); comparing the information to purchase transaction information (e.g., information contained in bill of sales); and/or concluding that the item was successfully purchased when a match exists between the information contained in the RFID response signal and the purchase transaction information. When such a conclusion is made, the RFID system causes a deactivate command to be transmitted from an NFC system (e.g., stationary POS device 210 or MPOS device 224 of FIG. 2), as shown by 326.

In 328, the deactivate command is received by the USD. In response to the deactivate command, the USD's IC performs operations to deactivate the USD's EAS response capability and/or the USD's RFID response capability. This deactivation can be achieved simply by setting one or bits stored in a memory (e.g., memory 112 of FIG. 1) to values (e.g., a zero or one) for causing deactivation of EAS and/or RFID response functions.

In scenarios, the item may be returned to a retail store (e.g., retail store facility 200 of FIG. 2). Accordingly, method 300 comprises optional 330 in which the USD's EAS response capability and/or the USD's RFID response capability is (are) reactivated. This reactivation can be achieved by: transmitting an NFC reactivation command from an NFC system (e.g., stationary POS device 210 of FIG. 2); receiving the NFC reactivation command at the USD; and performing operations by the USD's IC to reactivate the USD's EAS response capability and/or the USD's RFID response capability (e.g., by setting the one or bits stored in a memory (e.g., memory 112 of FIG. 1) to values (e.g., a zero or one) for causing reactivation of EAS and/or RFID response functions).

Upon completing 328 and/or 330, 332 is performed where method 300 ends or other processing is performed (e.g., return to 402).

Figure 4:
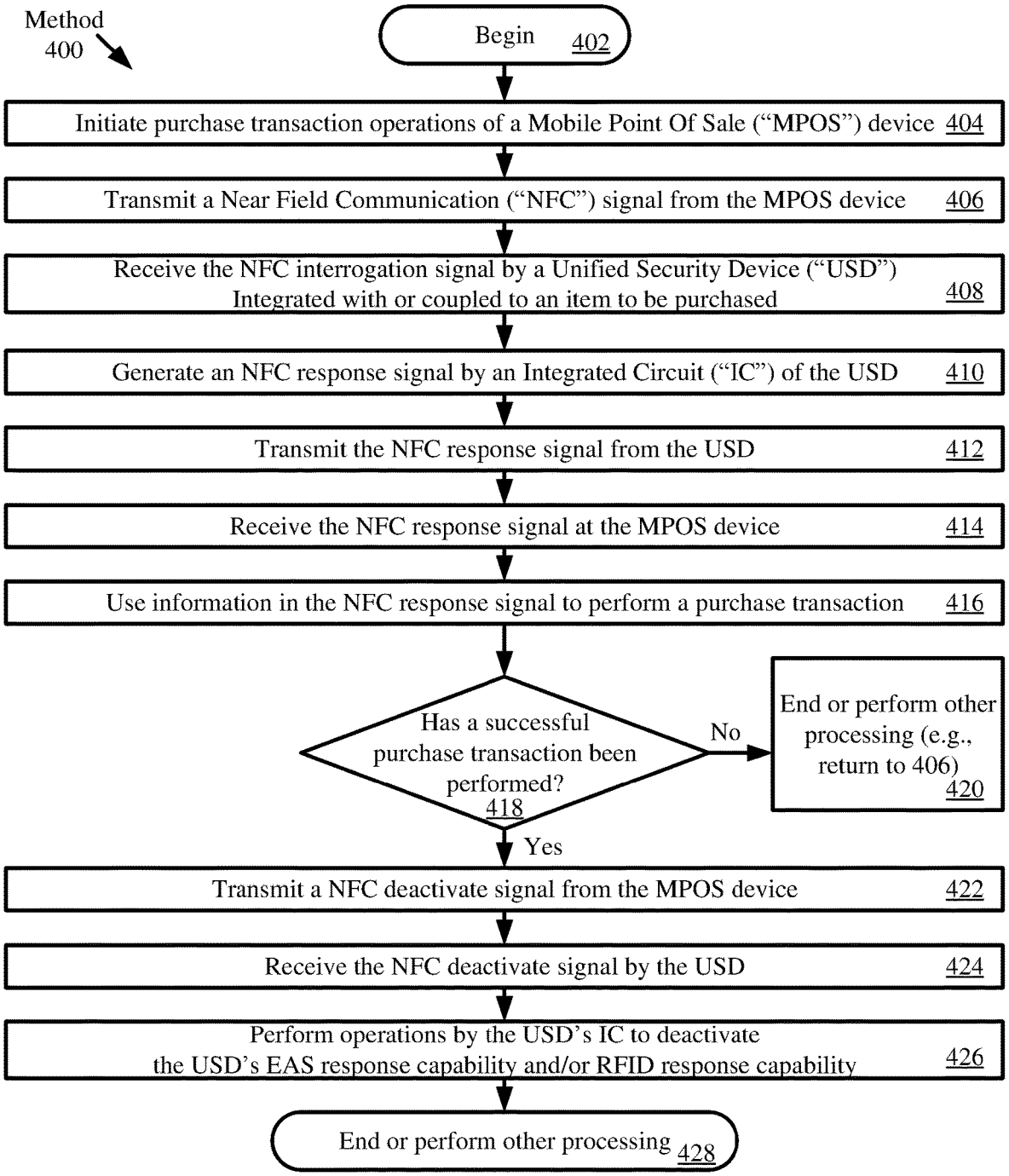

Referring now to FIG. 4, there is provided a flow diagram of an illustrative method 400 for operating a USD (e.g., USD 100 of FIGS. 1-2) in a self-checkout scenario. Method 400 begins with 402 and continues with 404 where purchase transaction operations of an MPOS device (e.g., MPOS 224 of FIG. 2) are initiated (e.g., via depression of a physical or virtual button of the MPOS device). MPOS devices are well known in the art, and therefore will not be described here.

During the purchase transaction, the MPOS device transmits an NFC interrogation signal in 406 to obtain information from the USD. NFC interrogation signals are well known in the art, and therefore will not be described herein. The NFC interrogation signal is received by the USD in 408. The USD is integrated with or coupled to an item (e.g., item 202 of FIG. 2) to be purchased. In response to the NFC interrogation signal, the IC of the USD generates an NFC response signal in 410. The NFC response signal is transmitted from the USD in 412. The NFC response signal is received at the MPOS device in 414. Information in the NFC response signal is used by the MPOS device in 416 to perform a purchase transaction. This information can include, but is not limited to, an identifier of the USD and/or an identifier for the item to/with which the USD is coupled/integrated. Purchase transactions are well known in the art, and therefore will not be described here. In 418, the MPOS device determines whether a successful purchase transaction has been performed. If not [418:NO], then 420 is performed where method 400 ends or other processing is performed (e.g., return to 406).

If so [418:YES], then method 400 continues with 422 where an NFC deactivate signal is transmitted from the MPOS device. The NFC deactivate signal is received by the USD in 424. In 426, the USD's IC performs operations to deactivate the USD's EAS response capability and/or the USD's RFID response capability. This deactivation can be achieved in the same or similar manner as that described above in relation to 328 of FIG. 3. Subsequently, 428 is performed where method 400 ends or other processing is performed (e.g., return to 406 of FIG. 4).

Figure 5:
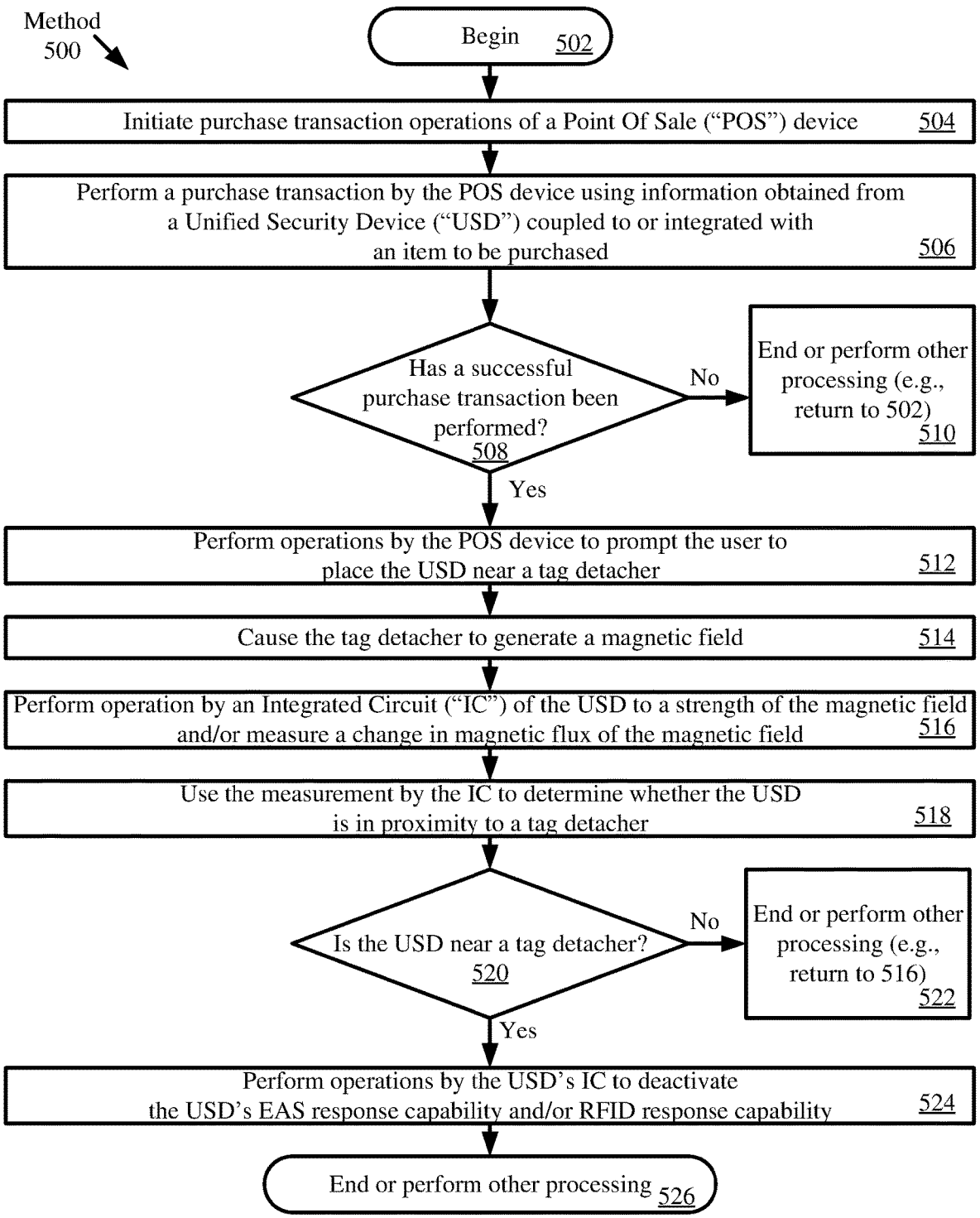

Referring now to FIG. 5, there is provided a flow diagram of an illustrative method 500 for operating a USD (e.g., USD 100 of FIG. 1) in a purchase transaction/tag detacher scenario. Method 500 begins with 502 and continues with 504 where purchase transaction operations of a POS device (e.g., POS device 210 of FIG. 2) are initiated (e.g., by depressing a physical or virtual button of the POS device). POS devices are well known in the art, and therefore will not be described herein.

In 506, a purchase transaction is performed by the POS device using information obtained from the USD that is coupled to or integrated with an item (e.g., item 202 of FIG. 2) to be purchased. Purchase transactions are well known in the art, and therefore will not be described herein. The information can include, but is not limited to, an identifier for the USD and/or an identifier for the item to/with which the USD is coupled/integrated. In 508, the POS device determines whether a successful purchase transaction has been performed. If not [508:NO], then 510 is performed where method 500 ends or other processing is performed (e.g., return to 502).

If so [508:YES], then method 500 continues with 512 where the POS device performs operations to prompt the user to place the USD near a tag detacher (e.g., tag detacher 230 of FIG. 2). Tag detachers are well known in the art, and therefore will not be described herein. Any known or to be known tag detacher can be used here without limitation provided that the tag detacher is configured to generate a magnetic field. In 514, the POS device causes the tag detacher to generate the magnetic field.

In 516, the IC of the USD performs operations to measure the strength of the magnetic field and/or a change in the magnetic flux of the magnetic field. The measurement is used in 518 to determine whether the USD is in proximity to a tag detacher. This determination can be made by comparing the measurement value to a pre-stored value or set of values to determine if a match exists therebetween (e.g., by a certain amount). If a match is found to exist, then a determination is made that the USD is in proximity to a tag detacher. The pre-stored value to which the measurement value matches may also indicate what type of tag detacher to which the USD is in proximity.

If the USD is not near a tag detacher [520:NO], then 522 is performed where method 500 ends or other processing is performed (e.g., return to 516). If the USD is near a tag detacher [520:YES], then method 500 continues with 524 where the USD's IC performs operations to deactivate the USD's EAS response capability and/or RFID response capability. The deactivation can be achieved in the same or similar manner as that discussed above in relation to 328 of FIG. 3 and/or 426 of FIG. 4 (e.g., a bit value is set in memory 112 of FIG. 1). Subsequently, 526 is performed where method 500 ends or other processing is performed.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method of operating a Unified Security Device ("USD"), comprising:
    receiving an Electronic Article Surveillance ("EAS") interrogation signal with an antenna of the USD, wherein:
        the USD comprises a single Integrated Circuit ("IC") chip that performs Electronic Article Surveillance ("EAS") communication operations, Radio Frequency Identification ("RFID") communication operations, and Near Field Communication ("NFC") operations, and
        the EAS communication operations are used for theft prevention, the RFID communication operations are used for inventorying purposes, and the NFC communication operations are used for purchase transaction purposes;
    processing the EAS interrogation signal using a processor unit of the USD;
    using the processor unit to generate an EAS response signal that emulates a response signal produced by an Acousto-Magnetic (AM) type of EAS security tag, in response to the EAS interrogation signal; and
    communicating the EAS response signal from the USD.

2. The method according to claim 1, further comprising using the processor unit to facilitate at least one of Radio Frequency Identification ("RFID") communication operations and Near Field Communication ("NFC") communication operations.

3. The method according to claim 2, further comprising receiving, by the USD, a first command signal via an RFID communication or an NFC communication.

4. The method according to claim 3, further comprising performing operations by the USD to disable at least one of an EAS communication function and an RFID communication function, in response to the first command signal.

5. The method according to claim 4, wherein a digital processing unit control of the USD is used to disable the at least one of an EAS communication function and an RFID communication function, in response to the first command signal.

6. The method according to claim 4, wherein the first command signal is communicated to the USD from a Point-Of-Sale ("POS") device or a personal electronic device.

7. The method according to claim 4, further comprising:
receiving, by the USD, a second command signal via an RFID communication or an NFC communication; and
performing operations by the USD to re-enable at least the EAS communication function, in response to the second command signal.

8. The method according to claim 2, further comprising performing operations by the USD to harvest energy from EAS signals.

9. The method according to claim 8, further comprising using the harvested energy to cause the USD to selectively transition operational modes from a passive mode to a Battery Assisted Passive ("BAP") mode for Radio Frequency Identification ("RFID") communications.

10. The method according to claim 1, wherein the USD comprises a thread incorporated into an item or is coupled to a swing ticket attached to the item.

11. The method according to claim 1, wherein the USD comprises a Software Defined Radio ("SDR").

12. The method according to claim 1, further comprising performing operations by the USD to obtain a measurement value for a strength of or a change in magnetic flux of a magnetic field being generated by an external device.

13. The method according to claim 12, further comprising using the measurement value to determine whether the USD is in proximity to a tag detacher.

14. The method according to claim 13, further comprising performing operations by the USD to deactivate at least one of an EAS communication function and a Radio Frequency Identification ("RFID") function, when a determination is made that the USD is in proximity to the tag detacher.

15. A Unified Security Device ("USD"), comprising:
an antenna to receive an Electronic Article Surveillance ("EAS") interrogation signal;
a processor unit;
comprising a single Integrated Circuit ("IC") chip that performs EAS communication operations, Radio Frequency Identification ("RFID") communication operations, and Near Field Communication ("NFC") operations, wherein the EAS communication operations are used for theft prevention, the RFID communication operations are used for inventorying purposes, and the NFC communication operations are used for purchase transaction purposes; and
operative to:
process the EAS interrogation signal,
generate an EAS response signal that emulates a response signal produced by an Acousto-Magnetic (AM) type of EAS security tag, in response to the EAS interrogation signal, and
the EAS response signal to be communicated from the USD using the antenna.

16. The USD according to claim 15, wherein the processor unit facilitates at least one of Radio Frequency Identification ("RFID") communication operations and Near Field Communication ("NFC") communication operations.

17. The USD according to claim 16, wherein the USD receives a first command signal via an RFID communication or an NFC communication.

18. The USD according to claim 17, wherein the USD performs operations to disable at least one of an EAS communication function and an RFID communication function, in response to the first command signal.

19. The USD according to claim 18, wherein a digital processing unit control of the USD is used to disable the at least one of an EAS communication function and an RFID communication function, in response to the first command signal.

20. The USD according to claim 18, wherein the first command signal is received from a Point-Of-Sale ("POS") device or a personal electronic device.

21. The USD according to claim 18, wherein the USD further:
receives a second command signal via an RFID communication or an NFC communication; and
performs operations to re-enable at least the EAS communication function, in response to the second command signal.

22. The USD according to claim 16, wherein the USD further harvests energy from EAS signals.

23. The USD according to claim 22, wherein the harvested energy is used to cause the USD to selectively transition operational modes from a passive mode to a Battery Assisted Passive ("BAP") mode for Radio Frequency Identification ("RFID") communications.

24. The USD according to claim 15, wherein the USD comprises a thread incorporated into an item or is coupled to a swing ticket attached to the item.

25. The USD according to claim 15, wherein the USD comprises a Software Defined Radio ("SDR").

26. The USD according to claim 15, wherein the USD further obtains a measurement value for a strength of or a change in magnetic flux of a magnetic field being generated by an external device.

27. The USD according to claim 26, wherein the measurement value is used to determine whether the USD is in proximity to a tag detacher.

28. The USD according to claim 27, wherein the USD further deactivates at least one of an EAS communication function and a Radio Frequency Identification ("RFID") function, when a determination is made that the USD is in proximity to the tag detacher.

* * * * *

UNITED STATES PATENT AND TRADEMARK OFFICE
CERTIFICATE OF CORRECTION

| | |
|---|---|
| PATENT NO. | : 11,295,590 B2 |
| APPLICATION NO. | : 16/662758 |
| DATED | : April 5, 2022 |
| INVENTOR(S) | : Steve E. Trivelpiece et al. |

It is certified that error appears in the above-identified patent and that said Letters Patent is hereby corrected as shown below:

In the Drawings

In Fig. 1, Sheet 1 of 7, and on the title page, the illustrated print figure, for Tag "102", in Line 1, delete "Main" and insert -- Primary --, therefor.

In the Specification

In Column 4, Line 41, delete "But by" and insert -- But --, therefor.
In Column 6, Line 65, delete "cove" and insert -- cover --, therefor.
In Column 7, Line 7, delete "in to" and insert -- in --, therefor.
In Column 12, Line 23, delete "bits" and insert -- - more bits --, therefor.
In Column 12, Line 37, delete "bits" and insert -- more bits --, therefor.
In Column 13, Line 3, delete "[418:N0],"  and insert -- [418:NO], --, therefor.
In Column 13, Line 35, delete "[508:N0]," and insert -- [508:NO], --, therefor.
In Column 13, Line 59, delete "[520:N0]," and insert -- [520:NO], --, therefor.

In the Claims

In Column 15, Line 44, in Claim 15, delete "unit;" and insert -- unit: --, therefor.
In Column 16, Line 3, in Claim 15, delete "the" and insert -- cause the --, therefor.

Signed and Sealed this
Twelfth Day of July, 2022

Katherine Kelly Vidal
*Director of the United States Patent and Trademark Office*